(12) United States Patent
Kubotera

(10) Patent No.: US 7,397,635 B2
(45) Date of Patent: Jul. 8, 2008

(54) HEAD SLIDER FOR DISK APPARATUS

(75) Inventor: Hiroyuki Kubotera, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 638 days.

(21) Appl. No.: 10/924,875

(22) Filed: Aug. 25, 2004

(65) Prior Publication Data
US 2005/0219755 A1 Oct. 6, 2005

(30) Foreign Application Priority Data
Mar. 31, 2004 (JP) ............................. 2004-106426

(51) Int. Cl.
G11B 5/60 (2006.01)
(52) U.S. Cl. .................................... 360/236.3; 360/237
(58) Field of Classification Search .............. 360/236.1, 360/236.2, 236.3, 237
See application file for complete search history.

(56) References Cited

U.S. PATENT DOCUMENTS

| | | | | |
|---|---|---|---|---|
| 6,229,671 B1 * | 5/2001 | Boutaghou et al. | ....... | 360/235.1 |
| 6,501,621 B1 | 12/2002 | Griffin et al. | ............. | 360/235.6 |
| 6,590,746 B2 * | 7/2003 | Kang et al. | .............. | 360/236.3 |
| 6,606,222 B1 * | 8/2003 | Ryun | ...................... | 360/236.5 |
| 6,628,480 B2 * | 9/2003 | Kohira et al. | ............ | 360/235.6 |
| 6,646,831 B1 | 11/2003 | Takagi et al. | ............. | 360/234.3 |
| 6,771,468 B1 * | 8/2004 | Levi et al. | ................ | 360/235.5 |
| 6,989,967 B2 * | 1/2006 | Pendray et al. | .......... | 360/236.5 |
| 7,123,449 B2 * | 10/2006 | Kang | ...................... | 360/235.8 |
| 2001/0022707 A1 * | 9/2001 | Koishi et al. | ............. | 360/236.2 |
| 2002/0001157 A1 * | 1/2002 | Kang et al. | ............... | 360/236.3 |
| 2003/0206374 A1 | 11/2003 | Ueda et al. | ................ | 360/236.3 |
| 2004/0032694 A1 | 2/2004 | Sun et al. | .................. | 360/236.3 |
| 2005/0010684 A1 | 1/2005 | Cha | ........................... | 709/238 |

FOREIGN PATENT DOCUMENTS

| | | |
|---|---|---|
| CN | 1455392 A | 11/2003 |
| CN | 1577594 A | 2/2005 |
| JP | 2000-173217 | 6/2000 |
| JP | 2001-283548 | 10/2001 |
| JP | 2003-323706 A | 11/2003 |
| JP | 2004-55127 | 2/2004 |

OTHER PUBLICATIONS

European Search Report dated Apr. 10, 2008.

* cited by examiner

*Primary Examiner*—Brian E Miller
(74) *Attorney, Agent, or Firm*—Kratz, Quintos & Hanson, LLP

(57) ABSTRACT

A head slider, of a disk apparatus, flying over a rotary magnetic recording disk, having a characteristic less dependent on the atmospheric pressure. The head slider of a disk apparatus comprises: a magnetic element adapted to fly over a magnetic recording medium; a medium opposing surface being formed with, with respect to the direction in which the medium moves, an inflow pad portion at the upstream end and a pair of side rail portions extending downstream from the inflow pad portion, and a center pad at the central part and a pair of side pads on the sides of the center pad and upstream of the center pad at the downstream end of the head slider. The center pad and the side pads are constituted so that a positive pressure generated by the side pads is greater than a positive pressure generated by the center pad.

4 Claims, 10 Drawing Sheets

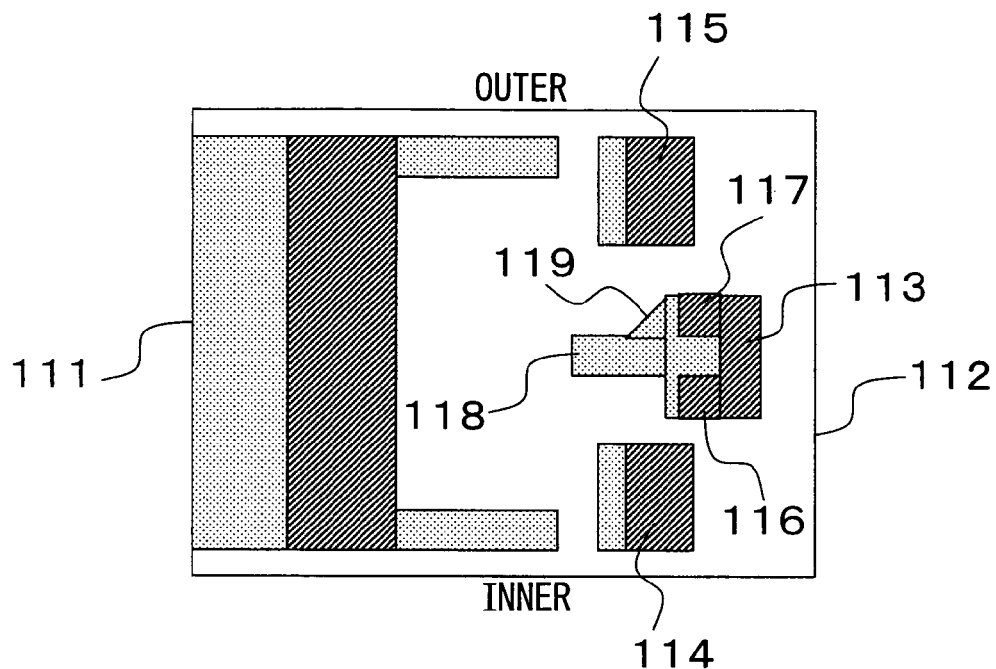
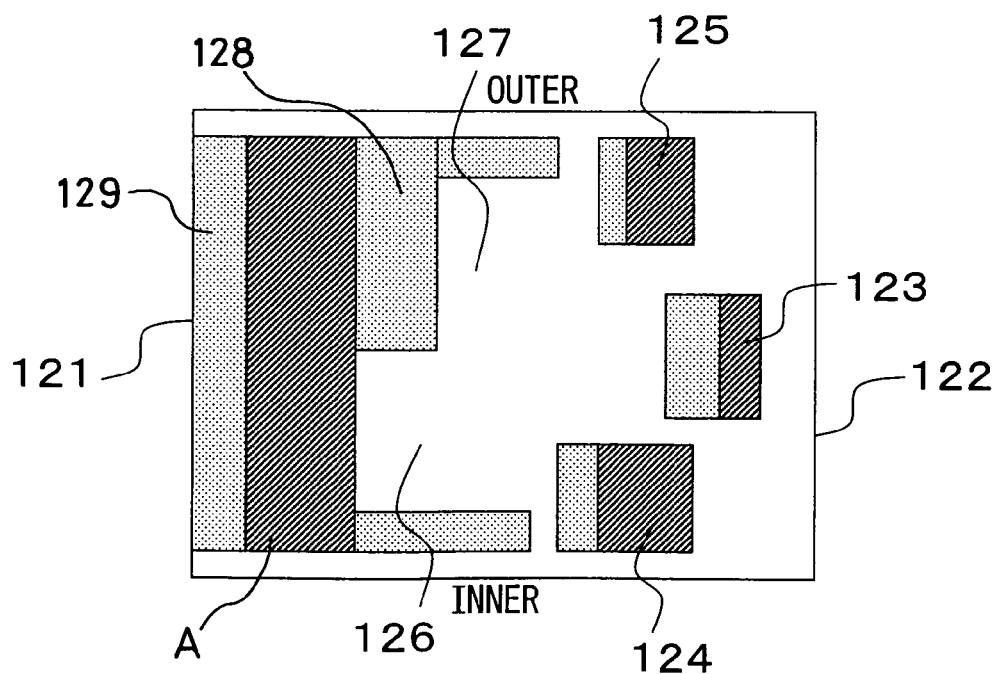

HEAD SLIDER FOR DISK APPARATUS

BACKGROUND OF THE INVENTION

1. Field of the Invention

The present invention relates to a head slider for a disk apparatus, or in particular, to a head slider for a disk apparatus comprising a magnetic element adapted to fly over a magnetic recording medium of a disk type to record or reproduce magnetic information between the magnetic element and the magnetic recording medium, wherein the surface of the head slider opposed to the medium is formed with, with respect to the direction in which the medium runs, an inflow pad portion at the upstream end and a pair of side rail portions extending downstream from the inflow pad portion, and a center pad at the central part and a pair of side pads on the sides of the center pad and upstream of the center pad at the downstream end of the head slider.

2. Description of the Related Art

First, a conventional disk apparatus having a magnetic slide header mounted thereon is explained with reference to FIG. 15. FIG. 15 is a plan view of the conventional magnetic disk apparatus 1, in which one or a plurality of disk-type magnetic recording media 3 are mounted on a rotatable spindle at predetermined intervals.

A head slider 10 is arranged for each of the obverse and reverse surfaces of each rotary magnetic recording medium 3, and each is supported through a suspension 5 at the end portion of an arm 4 of an actuator swingably supported on a pivot. The head slider 10 is adapted to be moved, in radial direction (for a seek operation) on each medium surface, by a voice coil motor 6.

The head slider 10 of the disk apparatus 1 having the structure described above, as shown in FIG. 16, moves outward or inward substantially radially on the disk-type recording medium while flying over the medium surface under a positive or negative pressure generated by the disk-type recording medium 3 rotating at high speed.

In FIG. 16, with the high-speed rotation of the magnetic recording medium 3 in the direction along arrow P, an air stream as shown is generated in the direction of the arrow P between the magnetic recording medium 3 and the head slider 10. Through this air film, under positive or negative pressure, the head slider 10 flies at a predetermined height from the surface of the magnetic recording medium 3 and is kept in predetermined spaced relation with the surface of the recording medium 3.

In order to realize the high-density packaging of the magnetic recording medium 3, the head slider 10 is desirably placed as near to the disk-type recording medium 3 as possible. Under various conditions, however, a predetermined interval is desirably maintained between the medium surface and the head slider. If the total length of the head slider 10 is 1.25 nm, the flying height t of the head slider 10 from the medium surface is tens and several nm or about 15 nm from the nearest portion of the medium surface where the recording/reproducing magnetic element 7 is mounted.

The head slider 10 of the disk apparatus, having the above-mentioned structure, flies over the medium surface due to the force generated by the disk-type recording medium 3 rotating at high speed in the direction of the arrow P in FIG. 17, while at the same time moving (the seek operation) outward or inward substantially radially over the disk-type recording medium.

As a result, the running speed of the disk-type recording medium 3 relative to the head slider 10 varies depending on whether the head slider 10 runs along the inner peripheral side, the middle peripheral side or the outer peripheral side of the disk-type recording medium 3. At the same time, the direction in which the disk recording medium 3 runs with respect to the head slider 3, i.e. the velocity vectors V1, V2, V3 and the directions thereof are varied. Specifically, between the innermost periphery and the outermost periphery, the running speed changes about twice and the speed vector changes about 25 degrees.

In designing the head slider 10 of the disk apparatus, therefore, it is important to maintain as uniform a flying height t (FIG. 16) of the head slider as possible over the whole periphery of the disk-type recording medium 3 and even allowing for a change in velocity or a change in the velocity vector.

In similar fashion, in the case where the arm 4 (FIG. 15) of the actuator supporting the head slider 10 performs the seek operation, the head slider 10 mounted at the forward end of the arm 4 moves radially inward at some timer and outward at other of the disk-type recording medium 3. In the process, the addition of the seek operation to the velocity vector of the head slider 10 with respect to the recording medium 3 changes the direction of the velocity vector ($V_4$ or $V_5$) by about 15 degrees.

With this direction change of the air flow, therefore, the flying height of the head slider, above the recording medium, is required to be maintained as uniform as possible.

Further, the device carrying the magnetic disk apparatus, whether it is a stationary computer or a mobile personal computer, is required to with stand operating conditions including a low atmospheric pressure. Generally, the HDD (hard disk drive) requires that the use at high altitudes is taken into account and therefore has to be operatively guaranteed even at an altitude of, say, 3000 m above sea level.

Furthermore, taking manufacturing problems such as machining errors and assembly errors into consideration, a robust design is required.

Of all the design problems of the head slider of the disk apparatus described above, this invention is especially intended to provide a head slider for the disk apparatus usable under low atmospheric pressure.

Specifically, the head slider of the conventional disk apparatus poses the problem that the flying height of the head slider decreases with low atmospheric pressure. Especially in the case where the head slider supported at the free end of the arm of the actuator is located on the inner side (inner side) of the disk medium while performing the seek operation radially of the rotating disk medium, the peripheral speed of the disk-type recording medium relative to the head slider is so low that a sufficient air-bearing pressure cannot be secured for the head slider. As a result, the flying height decreases considerably with a decrease in atmospheric pressure.

An attempt to secure a head slider having little dependency on the atmospheric pressure, i.e. having a characteristic robust against low atmospheric pressure encounters the problem of a decreased robustness against a change in peripheral speed. Also, with the decrease in atmospheric pressure, "the pitch angle", providing an inclination angle of the rotating head slider with respect to the direction upstream or downstream of the medium, decreases, as does the flying height of the head slider.

The conventional technique disclosed in Japanese Unexamined Patent Publication No. 2003-323706 related to this invention proposes a magnetic head in which the magnetic core is prevented from coming into contact with the magnetic recording medium by decreasing the effect of the atmospheric pressure on the spacing between the magnetic core and the magnetic recording medium in the case where the slider body flies over the magnetic recording medium.

JP-A 2003-323706 disclosed a head slider of a magnetic recording apparatus, wherein the center pad portion having the magnetic core is formed at the central part of the outflow end (trailing end portion) of the surface of the slider body opposed to the medium, and side pad portions are formed at the transverse end portions nearer to the inflow end (leading end) than the center pad portion. The total area of the surfaces of the two side pad portions opposed to the medium is larger than the area of the surface of the center pad portion opposed to the medium. Each pad portion is formed with a front stepped surface lower than the other parts on the leading side.

As described above, an attempt has been made to improved the robustness of the magnetic head slider against the variations in the atmospheric pressure by adjusting the area of the surfaces of the center pad portion and the side pad portion opposed to the medium. The method disclosed in patent reference 1, however, takes into consideration only the areas of the surface of the center pad portion and the side pad portions in opposed relation to the medium, and fails to sufficiently take into account the amount of the pressure generated by the center pad and the side pads.

In view of this, according to this invention, regardless of the area of the surface of the center pad portion and the side pad portions opposed to the medium, the positive pressure generated in the side pad portions is increased beyond the positive pressure generated in the center pad portion thereby to secure the robustness against the variations in the atmospheric pressure. Further, the robustness against the greater variations in the atmospheric pressure can be improved further by designing the shape of the side pad portion appropriately.

SUMMARY OF THE INVENTION

Accordingly, the object of this invention is to provide a head slider, of a disk apparatus, flying over a rotary disk-type magnetic recording medium, which has a characteristic less dependent on atmospheric pressure, i.e. is robust against variations in the atmospheric pressure and minimizes the change in the flying height of the head slider even under low atmospheric pressure.

According to the present invention, there is provided a head slider of a disk apparatus comprising: a magnetic element adapted to fly over a disk type magnetic recording medium to record or reproduce magnetic information between the magnetic element and the magnetic recording medium; a surface of the head slider opposed to the medium being formed with, with respect to the direction in which the medium runs, an inflow pad portion at the upstream end and a pair of side rail portions extending downstream from the inflow pad portion, and a center pad at the central part and a pair of side pads on the sides of the center pad and upstream of the center pad at the downstream end of the head slider; and the center pad and the side pads being constituted so that a positive pressure generated by the side pads is greater than a positive pressure generated by the center pad.

The positive pressure generated by the side pads is greater than the positive pressure generated by the center pad when the head slider is located in an inner peripheral area of the magnetic recording medium.

In a head slider of the disk apparatus as mentioned above, at least one of the side pads has an air-bearing surface and a stepped surface, a height thereof is smaller than that of the air bearing surface, one of the air-bearing surface and the stepped surface has a longitudinal extension and a traverse extension to define a substantially L-shaped structure.

At least one of the side pads has the longitudinal extension of the substantially L-shaped structure, located in an outer peripheral side with respect to the magnetic recording medium, so that the substantially L-shaped structure is opened to an inner peripheral side with respect to the magnetic recording medium.

In a head slider of the disk apparatus, as mentioned above, each of the inflow pad portion, the center pad and the side pads has an air-bearing surface and a stepped surface, the height thereof being smaller than that of the air bearing surface, at least one of the side rail portions is connected with the corresponding and at least the side rail portion is arranged nearer to a traverse center of the head slider by 10 μm or more from a corresponding side edge of the head slider.

The side rail portions are constituted so that a connecting portion with the inflow pad portion or a connecting portion with the side pad is defined by an obtuse angle.

In a head slider of the disk apparatus as mentioned above, the center pad has an air-bearing surface and a stepped surface at an outflow side of the air-bearing surface and has a height smaller than that of the air bearing surface, the air bearing surface has a traverse extension at an outflow area of the center pad and front longitudinal extensions at respective sides of the center pad to define a substantially U-shaped structure, and a stepped surface has an immediately front area of the air bearing surface and a central protrusion extending upstream of the head slider form the immediately front area.

A connecting portion of the central protrusion of the stepped surface is, with respect to the immediately front area, provided with a chamfered portion at an outer side with respect to the recording medium.

In a head slider of the disk apparatus as mentioned above, a negative pressure area is defined as an area surrounded by the inflow pad portion and side rail portions; the negative pressure area comprises an inner peripheral negative pressure area and an outer peripheral negative pressure area with respect to the recording medium, and the inner peripheral negative pressure area is extended more toward the inflow edge of the head slide than the outer peripheral negative pressure area.

In a head slider of the disk apparatus as mentioned above, a negative pressure area is defined an area surrounded the inflow pad portion and side rail portions; a starting point of the negative pressure area is defined by a point within 25 percent from an inflow edge of the head slider with respect the entire length of the head slider.

In a head slider of the disk apparatus as mentioned above, the inflow pad portion has an air-bearing surface transversely extending along an upstream end portion of the head slider and a stepped surface having a height smaller than that of the air-bearing surface and transversely extending between the air-bearing surface an upstream edge of the of the head slider, and the stepped surface is provided with at least two projections having a height similar to that of the air-bearing surface.

BRIEF DESCRIPTION OF THE INVENTION

FIG. 11 is a plan view showing an 11th embodiment of the invention;

FIG. 12 is a plan view showing a 12th embodiment of the invention;

DESCRIPTION OF THE PREFERRED EMBODIMENTS

Embodiments of the invention are described in detail below with reference to the accompanying drawings.

Figure 19:
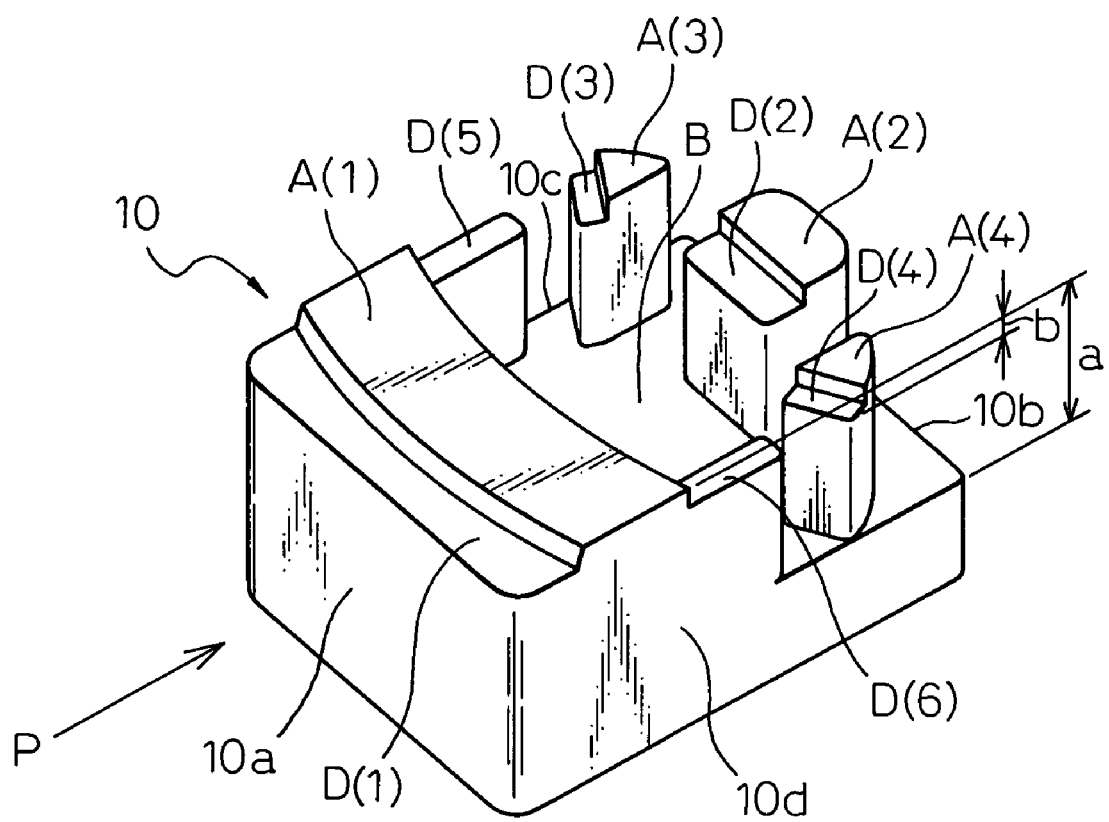
FIG. 19 is a perspective view as taken from the surface of the head slider opposed to the medium.

FIGS. 1 to 14 are plan views taken from that side of a head slider of a disk apparatus, according to each embodiment of the invention, which is in opposed relation to a medium. FIG. 19 is a perspective view of the head slider according to the invention taken from the surface thereof opposed to the magnetic recording medium, or especially, the uneven surface of the slider opposed to the medium. In FIG. 19, the heights from the bottom surface B to the air-bearing surface (ABS) and to the stepped surface D are exaggerated.

In FIG. 19, the head slider body 10 is formed of an appropriate ceramic material such as alumina titanium carbide (AlTiC) and is fabricated by a conventionally well-known method such as ion milling or ion etching. The head slider body 10 assumes a substantially rectangular plan view taken from the side thereof opposed to the medium. With respect to the direction P in which the magnetic recording medium rotates, the head slider body 10 includes an inflow end 10*a* constituting an upstream transverse edge, a outflow end 10*b* constituting a rear transverse edge and longitudinal side edges 10*c*, 10*d*.

In order to secure the required air-bearing force between the surface of the head slider 10 opposed to the medium and the rotating magnetic recording medium, minuscule unevenesses are formed on the particular opposed surface of the head slider 10 to thereby control the pressure. Especially, a sophisticated air-bearing function is realized by properly controlling the combinations of the positive and negative pressures generated by the minuscule unevenesses.

As shown in FIG. 19, the head slider 10 has an uneven surface in three steps opposed to the medium. In this specification, the surface B primarily forming a negative pressure surface farthest from the surface of the magnetic recording medium is defined as "the bottom surface", the surface A primarily forming a positive pressure surface located nearest to the surface of the magnetic recording medium is defined as "the air-bearing surface (ABS)", and the surface D slightly stepped down from the air-bearing surface A is defined as "the stepped surface". The depth a from the air-bearing surface A to the bottom surface B is about 1 to 3 μm, and the depth b from the air-bearing surface A to the stepped surface D is about 0.1 to 0.3 μm.

The air-bearing surface A includes an inflow pad portion A(1), located in proximity to and in slightly spaced relation with the upstream end, extending over the entire width of the head slider body 10 transverse to the direction P in which the medium rotates. A center pad portion A(2) is located at the central part of the downstream end along the direction P. Further, side pad portions A(3), A(4) are located on both sides slightly upstream of the center pad portion A(2).

On the other hand, the stepped surface D includes, in terms of direction P in which the medium runs, an inflow-side stepped surface D(1) extending over the entire transverse area forward of the inflow pad portion A(1), side rail portions D(5), D(6) extending downstream along the two side edges of the head slider from the inflow pad portion A(1), and a center stepped surface D(2) and side stepped surfaces D(3), D(4) arranged forward of the center pad portion A(2) and the side pad portions A(3), A(4).

The surface area of the head slider 10, opposed to the medium, other than the air-bearing surface A and the stepped surface D constitutes the bottom surface B. Especially, the central area of the bottom surface B of the head slider opposed to the medium which is defined by the inflow pad portion A(1), the side rail portions D(5), D(6), the center pad portion A(2), the stepped surface D(2), the side pad portions A(3), A(4) and the stepped surfaces D(3), D(4) makes up a negative pressure portion.

The air-bearing force of the head slider 10 against the recording medium surface can be controlled by changing various parameters including the shape and area of the air-bearing surface A and the stepped surface D of the head slider 10 opposed to the medium.

Next, the air-bearing surface A and the stepped surface D of the head slider 10, opposed to the medium, according to various embodiments of the invention are explained with reference to FIGS. 1 to 14. In these diagrams, as defined above, the air-bearing surface A is hatched, the stepped surface D dotted and the bottom surface B outlined.

Figure 1:
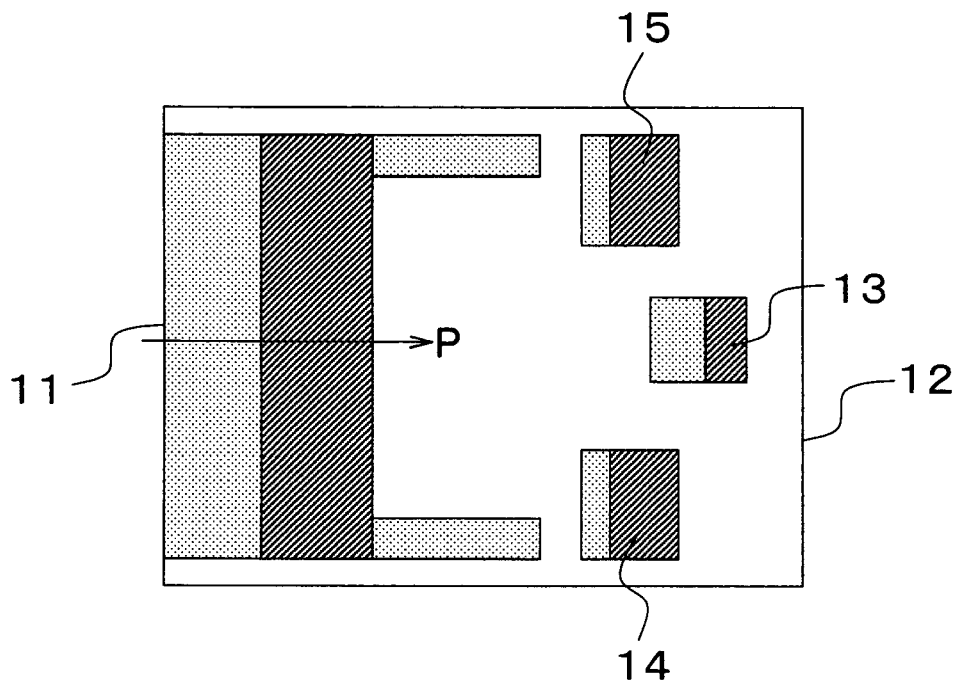
FIG. 1 is a plan view showing a first embodiment of the invention.

FIG. 1 is a plan view showing the surface of the head slider opposed to the medium according to a first embodiment of the invention. In FIG. 1, reference numeral 11 designates an inflow end by way of which the air flows in and numeral 12 an outflow end by way of which the air flows out. Numeral 13 designates a center pad portion, and numerals 14, 15 side pad portions. According to the first embodiment, the pressure (positive pressure) generated by the two side pad portions 14, 15 is set larger than the pressure (positive pressure) generated by the center pad portion 13. As a result, the flying height is prevented from being decreased extremely by a drop in atmospheric pressure.

Specifically, in addition to the area of the air-bearing surface A of the center pad portion 13 and the area of the air-bearing surface A of the side pad portions 14, 15, such factors as the size, shape, arrangement of the center pad portion 14 and the side pad portions 14, 15 and the corresponding size, shape, arrangement and other physical configurations of the stepped surface D are variously changed. In this way, the pressure generated by the two side pad portions 14, 15 can be set larger than the pressure generated by the center pad portion 13. The magnitude of the pressure obtained, on the surface of the head slider opposed to the medium, by factors including the size, shape and arrangement, is specifically determined by computer simulation.

Figure 2:
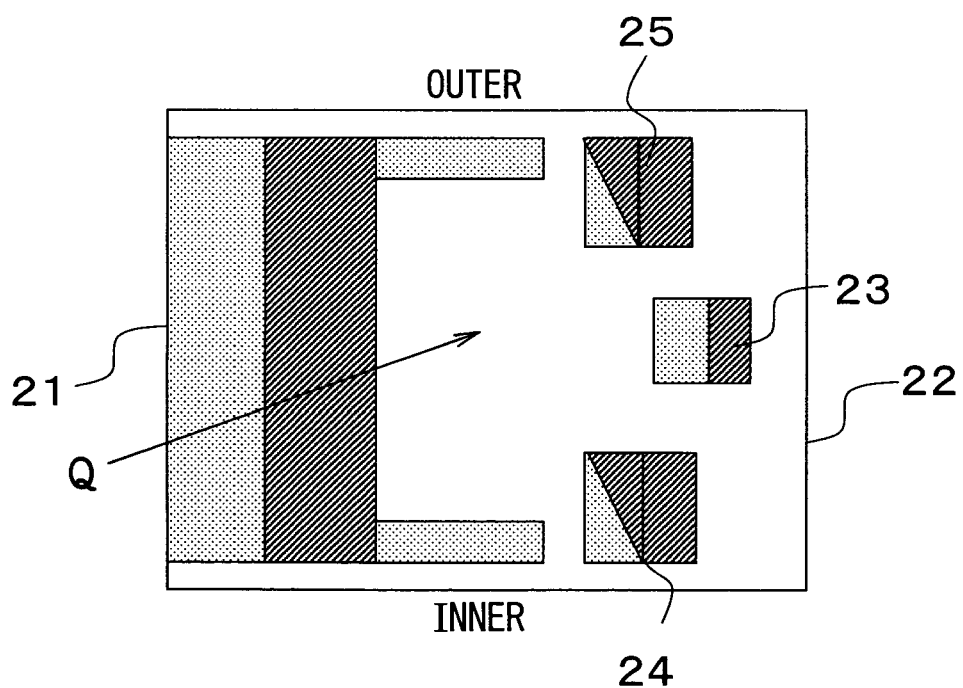
FIG. 2 is a plan view showing a second embodiment of the invention.
Figure 17:
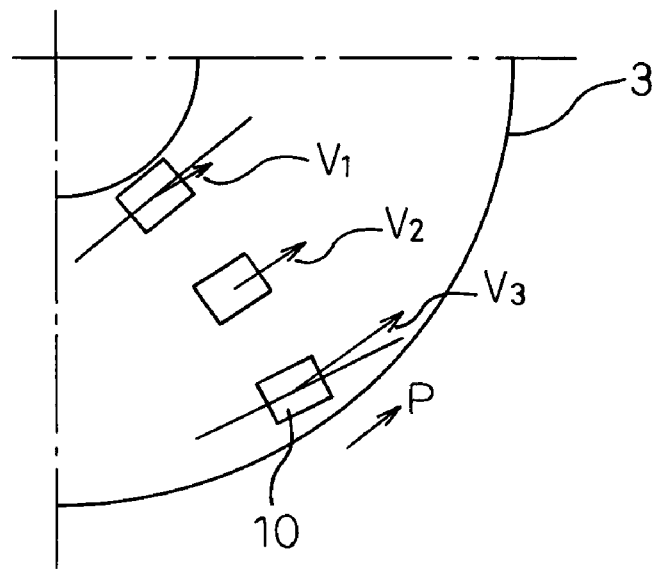
FIG. 17 is a diagram showing the relation between the position of the head slider and the flow velocity vectors.
Figure 18:
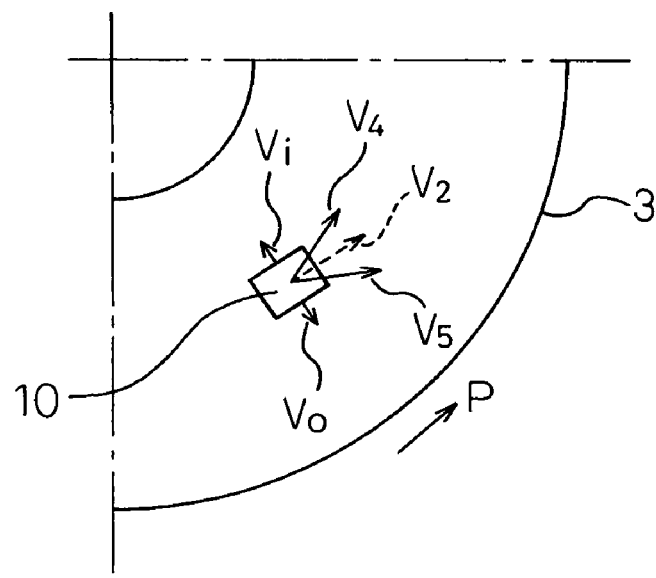
FIG. 18 is a diagram showing the relation between the seek operation of the head slider and the flow velocity vectors.

FIG. 2 is a plan view showing the surface of the slider head opposed to the medium according to a second embodiment of the invention. Numeral 21 designates an inflow end by way of which the air flows in, and numeral 22 an outflow end by way of which the air flows out. Numeral 23 designates a center pad portion, and numerals 24, 25 side pad portions. According to the second embodiment, in the case where the head slider is located radially inside of the recording medium, the air flows from the lower left portion to the upper right portion in FIG. 2 in the direction along arrow Q (in reverse relation with the case of FIG. 17). Thus, as shown in FIG. 2, the front edge of the air-bearing surface A of the side pad portions 24, 25 is directed inward to increase the pressure generated by the air flow along the direction of arrow Q. As a result, as long as the head slider is located radially inside of the magnetic recording medium, the pressure generated by the side pad portions 24, 25 is increased.

Specifically, a higher pressure (positive pressure) is generated by the side pad portions 24, 25 when the head slider is located in the inner peripheral area than in the outer peripheral area of the magnetic recording medium. This prevents an extreme decrease in the flying height of the head slider which otherwise might be caused by a drop in atmospheric pressure in the case where the head slider is located radially inside of the magnetic recording medium and the relative speed between the head slider and the magnetic recording medium is reduced.

Figure 3:
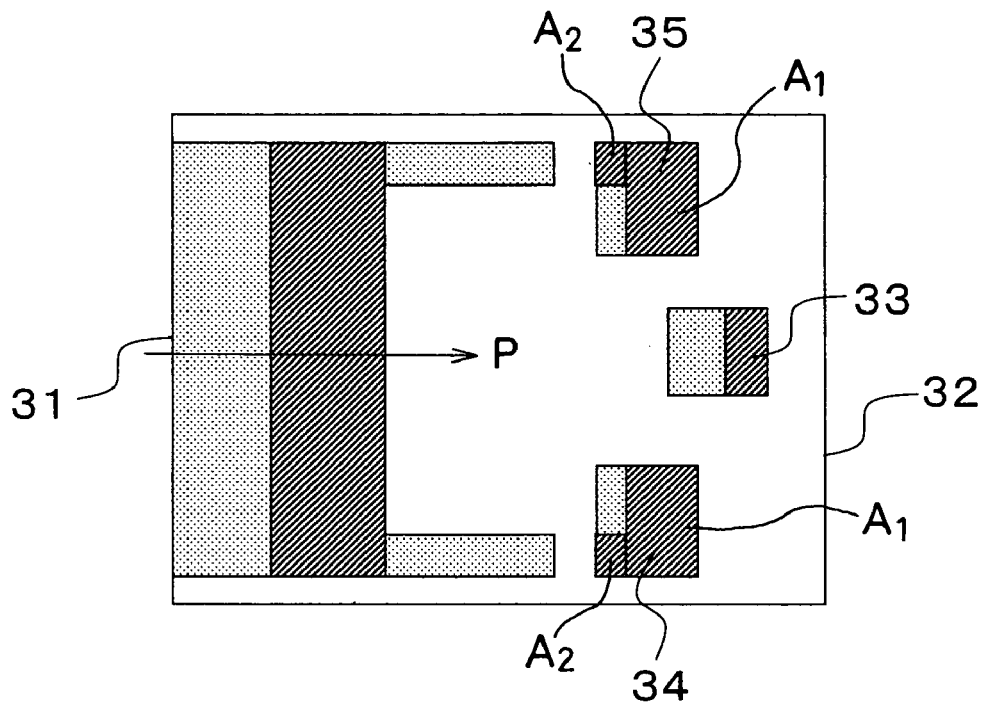
FIG. 3 is a plan view showing a third embodiment of the invention.

FIG. 3 is a plan view showing the surface of the head slider opposed to the medium according to a third embodiment of the invention. Numeral 31 designates an inflow end by way of which the air flows in, and numeral 32 an outflow end by way of which the air flows out. Numeral 33 designates a center pad portion, and numerals 34, 35 side pad portions. According to the third embodiment, the air-bearing surface A of each of the side pad portions 34, 35 is formed into a substantially L-shaped structure by the rear transverse extension A1 and the longitudinal extension A2. The stepped surface D is extended to the central edge and the upstream edge defined by the air-bearing surface A1, A2 of the substantially L-shaped structure. Thus, the air-bearing surfaces A of the side pad portions 34, 35 of the stepped surface D are mutually directed toward the center as shown in FIG. 3. Specifically, each longitudinal extension A2 is located nearer to the side edge of the slider body than the corresponding stepped surface. As a result, the air flowing in along the direction of arrow P is concentrated effectively by the side pad portions, as banks, so that the pressure generated by the side pad portions 34, 35 increases. Thus, an extreme decrease in the flying height of the head slider, which might otherwise be caused by the drop in atmospheric pressure, is prevented.

Figure 4:
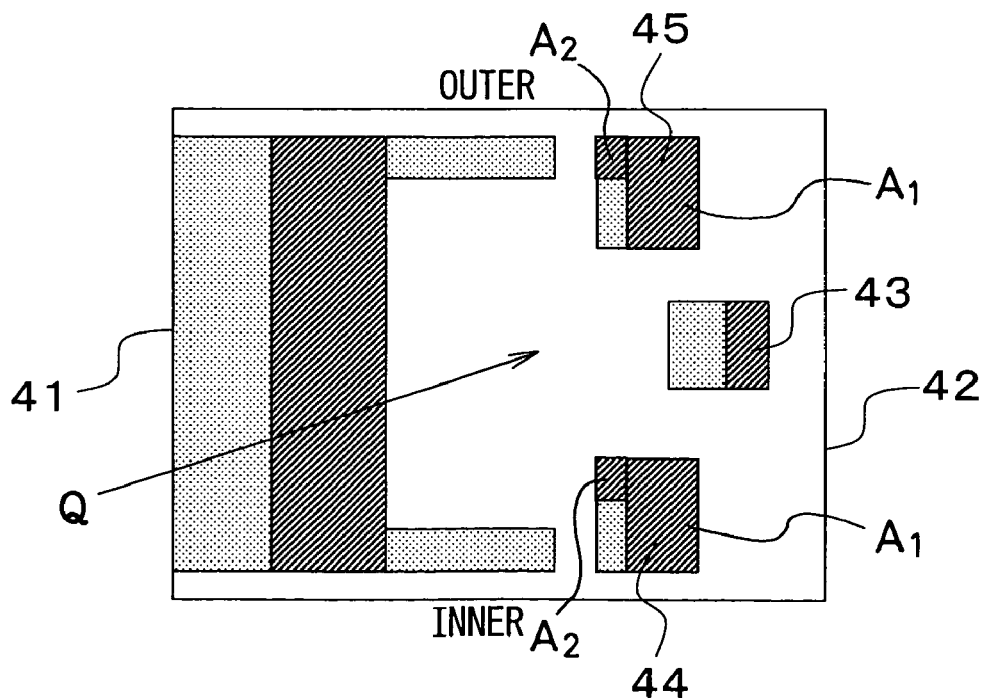
FIG. 4 is a plan view showing a fourth embodiment of the invention.

FIG. 4 is a plan view showing the surface of the head slider opposed to the medium according to a fourth embodiment of the invention. Numeral 41 designates an inflow end by way of which the air flows in, and numeral 42 an outflow end by way of which the air flows out. Numeral 43 designates a center pad portion, and numerals 44, 45 designate side pad portions. According to the fourth embodiment having a similar configuration to the third embodiment, the air-bearing surface A of the side pad portions 34, 35 according to the third embodiment is formed into a substantially L-shaped structure by the rear transverse extension A1 and the longitudinal extension A2. The stepped surface D is extended to the central edge and the upstream edge of the air-bearing surface A1 of the substantially L-shaped structure. In the case where the head slider is located on the inner peripheral side of the magnetic recording medium, the air flows in the direction of arrow Q from the lower left portion toward the upper right portion in FIG. 4.

Thus, the longitudinal extension A2 of the air-bearing surface A of the substantially L-shaped structure of the side pad portion 44 located inside is arranged nearer to the outer periphery of the recording medium, i.e. nearer to the center of the head slider in the stepped surface D as shown in FIG. 4. As a result, especially in the case where the head slider is located radially inside of the magnetic recording medium, the air flowing in the direction along arrow Q is received by the substantially L-shaped air-bearing surfaces A of the side pad portions 44, 45, thereby increasing the pressure generated by the side pad portions 44, 45.

Specifically, the side pad portions 44, 45 generate a higher pressure (positive pressure) in the case where the head slider is located more inside than outside radially of the magnetic recording medium. Thus, it is possible to prevent an extreme decrease in the flying height of the head slider, which otherwise might be caused by the drop in atmospheric pressure, in the case where the head slider is located radially inside of the magnetic recording medium where the relative speed is reduced between the head slider and the magnetic recording medium.

Figure 5:
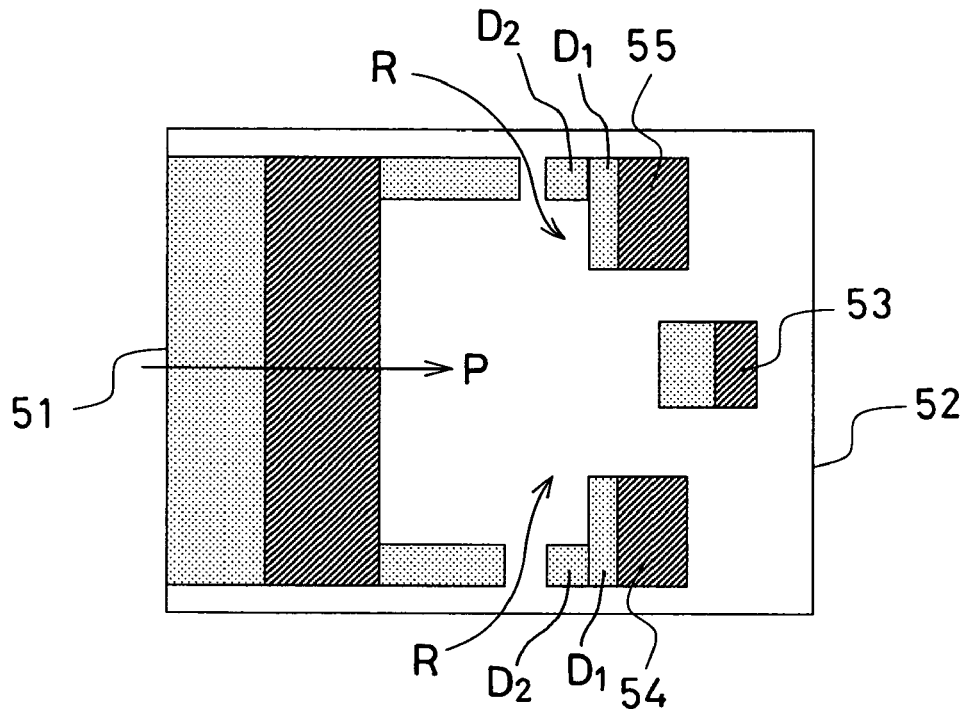
FIG. 5 is a plan view showing a fifth embodiment of the invention.

FIG. 5 is a plan view showing the surface of the head slider opposed to the medium according to a fifth embodiment of the invention. Numeral 51 designates an inflow end by way of which the air flows in, and numeral 52 an outflow end by way of which the air flows out. Numeral 53 designates a center pad portion, and numerals 54, 55 side pad portions. According to the fifth embodiment, the stepped surface D extending forward of the air-bearing surface A of the side pad portions 54, 55 is formed into a substantially L-shaped structure by the rear transverse extension D1 and the longitudinal extension D2. The longitudinal extensions D2 of the substantially L-shaped structure of the stepped surfaces D of the two side pad portions 54, 55 are arranged on the outer peripheral side of the head slider. Thus, the air stream flowing in along arrow P and reaching the front part of the side pad portions 54, 55 is directed inward by the stepped surface D of the substantially L-shaped structure of the side pad portions 54, 55. The air streams flowing into the head slider in the directions of arrows R are also controlled.

In this way, the air stream is effectively concentrated with the stepped surface D2 of the substantially L-shaped structure as a bank, thereby increasing the pressure generated by the side pad portions 54, 55. As a result, the flying height of the head slider is prevented from extremely decreasing due to the drop in the atmospheric pressure.

Figure 6:
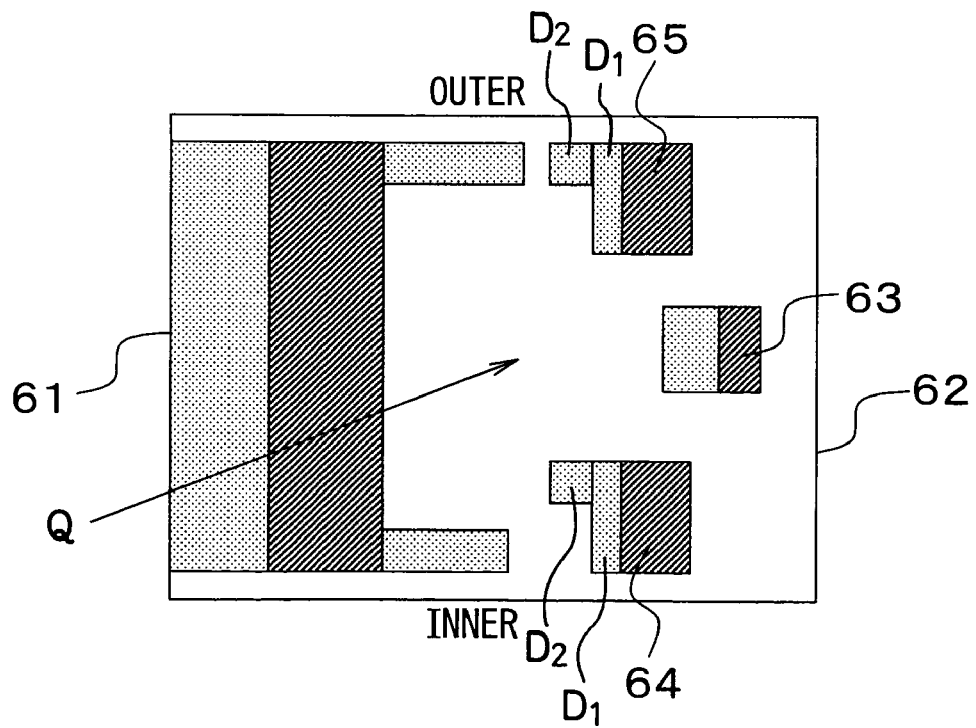
FIG. 6 is a plan view showing a sixth embodiment of the invention.

FIG. 6 is a plan view showing the surface of the head slider opposed to the medium according to a sixth embodiment of the invention. Numeral 61 designates an inflow end by way of which the air flows in, and numeral 62 an outflow end by way of which the air flows out. Numeral 63 designates a center pad portion, and numerals 64, 65 side pad portions. The sixth embodiment has a similar configuration to the fifth embodiment in that the stepped surface D extending on the front of the air-bearing surface A of each of the side pad portions 64, 65 is formed into a substantially L-shaped structure by the rear transverse extension D1 and the longitudinal extension D2. Nevertheless, the longitudinal extensions D2 of the substantially L-shaped structure of the stepped surfaces D of the two side pad portions 64, 65 are both arranged on the outer peripheral side of the magnetic recording medium.

With this structure, in the case where the head slider is located radially inside of the magnetic recording medium, the air flows in the direction along arrow Q from the lower left portion toward the upper right portion in FIG. 6. By arranging the longitudinal extension D2 on the front of the substantially L-shaped stepped surface D of each of the side pad portions 64, 65 on the outer peripheral side of the magnetic recording medium as shown in FIG. 6, therefore, the air flowing in the direction along arrow Q is received by the substantially L-shaped stepped surface D of the side pad portions 64, 65 in the case where the head slider is located radially inside of the magnetic recording medium. Therefore, the pressure generated by the side pad portions 64, 65 is increased. As a result, it is possible to prevent the extreme decrease in the flying height of the head slider which otherwise might be caused by the drop in atmospheric pressure in the case where the head slider is located radially inside the magnetic recording medium where the relative speed is reduced between the head slider and the magnetic recording medium.

Figure 7:
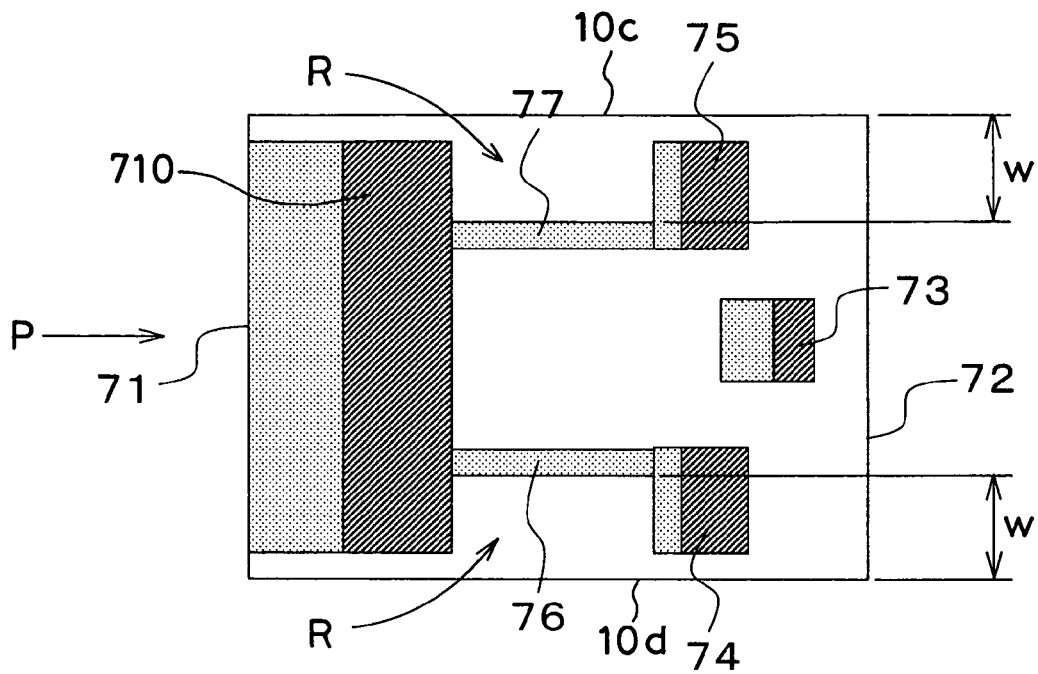
FIG. 7 is a plan view showing a seventh embodiment of the invention.

FIG. 7 is a plan view showing the surface of the head slider opposed to the medium according to a seventh embodiment of the invention. Numeral 71 designates an inflow end by way of which air flows in, and numeral 72 an outflow end by way of which air flows out. Numeral 3 designates a center pad portion, numerals 74, 75 side pad portions, and numerals 76, 77 side rail portions. According to the seventh embodiment, the side rail portions 76, 77 formed as a stepped surface D are arranged nearer to the transverse center of the head slider by W (10 μm or more, for example) from the side edges 10c, 10d thereof, respectively. Also, the upstream end of each of the side rails 76, 77 is coupled to the air-bearing surface A of the inflow pad portion 710, while each downstream end thereof is connected to the stepped surfaces of the side pad portions 74, 75. Thus, the air-bearing surface A of the inflow pad portion 710, the side pad portions 76, 77 and the stepped surface of the side pad portions 74, 75 are longitudinally connected.

According to the seventh embodiment, as described above, the side rails 76, 77 are arranged nearer to the transverse center of the head slider by W (10 μm or more, for example) from the side edges 10c, 10d of the head slider while at the same time being connected to the air-bearing surface A of the inflow pad portion 710, As a result, the side pad portions 76, 77 constitute banks whereby the air flowing in the direction of arrow P is concentrated effectively. Especially, this structure exhibits a greater effect of concentrating the air streams R that have circumvented inside of the head slider. As a result, the side pad portions 74, 75 generate a higher pressure, and the extreme decrease in the flying height of the head slider, due to a drop in atmospheric pressure, is prevented.

Figure 8:
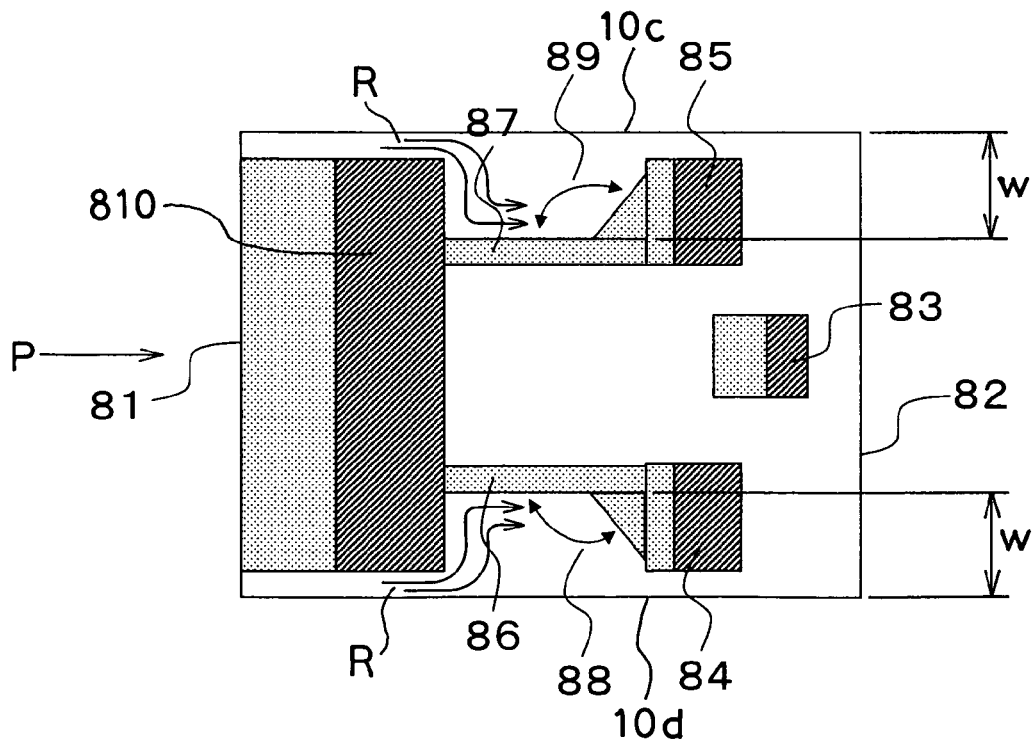
FIG. 8 is a plan view showing an eighth embodiment of the invention.

FIG. 8 is a plan view showing the surface of the head slider opposed to the medium according to an eighth embodiment of the invention. Numeral 81 designates an inflow end by way of which the air flows in, and numeral 82 an outflow end by way of which the air flows out. Numeral 83 designates a center pad portion, numerals 84, 85 side pad portions, numerals 86, 87 side rail portions, and numerals 88, 89 the angles at which the side rail portion and the corresponding side pad portion are connected to each other. According to the eighth embodiment, as in the seventh embodiment, the side rail portions 86, 87 formed as a stepped surface D are arranged nearer to the transverse center of the head slider by W (10 μm or more, for example) from the side edges 10c, 10d thereof, respectively. Thus, the air-bearing surface A of the inflow pad portion 810, the side rail portions 86, 87 and the stepped surface of the side pad portions 84, 85 are continuously connected to each other.

According to the eighth embodiment, however, the angle of each connecting portion between the side rail portions 86, 87 and the stepped surface of each of the side pad portions 84, 85 is rendered obtuse on the side nearer to the outer periphery of the magnetic head slider by forming a chamfered portion. These chamfered portions are also formed as stepped surfaces. In this way, according to the eighth embodiment, the side rail portions 86, 87 are arranged nearer to the transverse center of the head slider by size w (10 μm or more, for example) from the head slider side edges 10c, 10d while at the same time being connected to the air-bearing surface A of the inflow pad portion 810. Further, the angles 88, 89 of the connecting portion between each of the side rail portions 86, 87 and the stepped surface of each of the side pad portions 84, 85 are rendered obtuse on the side nearer to the outer periphery of the head slider. As in the seventh embodiment, therefore, the side rail portions 86, 87 make up banks, so that the air flowing in along the direction of arrow P (or inward of the head slider along the direction of arrow R) is effectively concentrated. Also, when the head slider is being machined, stands by for operation against the recording medium or is flying, the chance of dust or dirt being deposited at or around the side rail portions 86, 87 is reduced. Especially when the head slider flies, the dust and dirt attached to the surface of the magnetic recording medium rotating at high speed is possibly prevented effectively from flowing into the head slider together with the air flowing in along the direction of arrow R.

Figure 9:
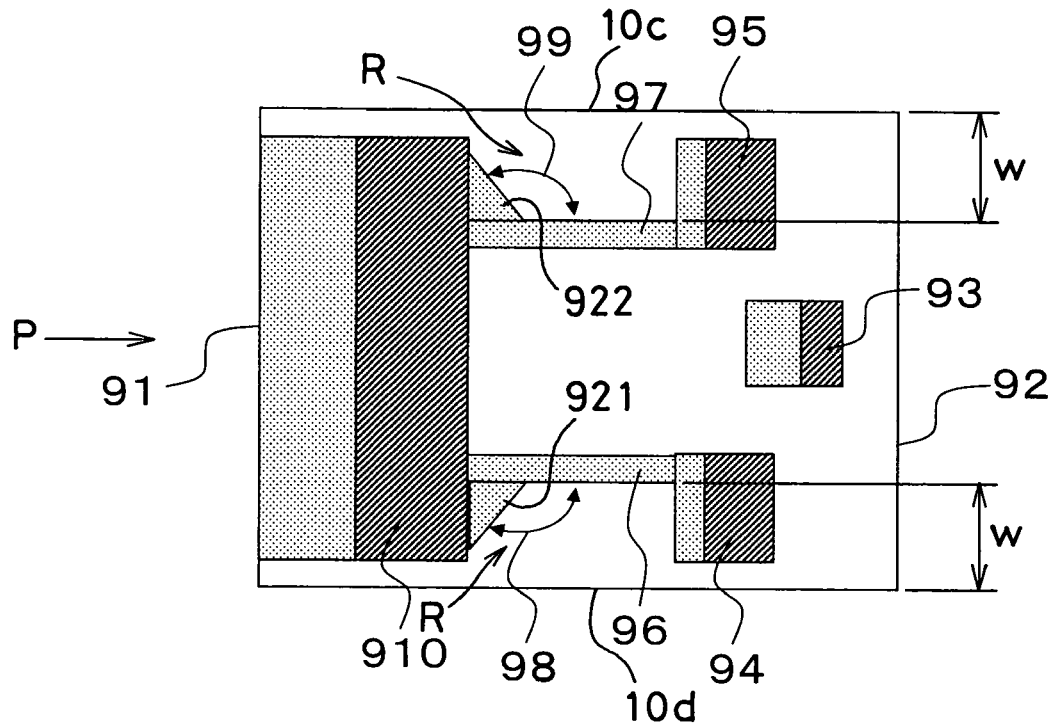
FIG. 9 is a plan view showing a ninth embodiment of the invention.

FIG. 9 is a plan view showing the surface of the head slider opposed to the medium according to a ninth embodiment of the invention. Numeral 91 designates an inflow end by way of which the air flows in, and numeral 92 an outflow end by way of which the air flows out. Numeral 93 designates a center pad portion, and numerals 94, 95 side pad portions, numerals 96, 97 side rail portions, and numerals 98, 99 angles of the connecting portion between the side rail portions and the inflow pad portion 910. According to the ninth embodiment, as in the seventh embodiment, the side rail portions 96, 97 formed as a stepped surface D are arranged nearer to the transverse center of the head slider by size w (10 μm or more, for example) from the side edges 10c, 10d of the head slider, while at the same time longitudinally connecting the air-bearing surface A of the inflow pad portion 910, the side rail portions 96, 97 and the stepped surface of the side pad portions 94, 95.

In the ninth embodiment, however, chamfered portions 921, 922 are formed to assure an obtuse angle, on the side nearer to the outer periphery of the head slider, of the connecting portion between the side rail portions 96, 97 and the air-bearing surface A of the inflow pad portion 910. The chamfered portions 921, 922 are also formed as a stepped surface. In this way, according to the ninth embodiment, the side rail portions 86, 87 are arranged nearer to the transverse center of the head slider by size W (10 μm or more, for example) from the head slider side edges 10c, 10d while at the same time being connected to the air-bearing surface A of the inflow pad portion 810. Further, the outer angles 88, 89 of the connecting portion between the side rail portions 86, 87 and the inflow pad portion 910 are rendered obtuse. Like in the seventh embodiment, therefore, the side rail portions 86, 87 make up banks, so that the air flowing in along the direction of arrow P (or inward of the head slider along the direction of arrow R) is effectively concentrated. Also, when the head slider is being machined, standing by for operation against the recording medium or is flying, the chance of dust or dirt being deposited at or around the side rail portions 86, 87 is reduced. Especially when the head slider is flying, the dust and dirt attached to the surface of the magnetic recording medium rotating at high speed is effectively prevented from flowing into the head slider together with the air flowing in the direction of arrow R.

In the embodiments shown in FIGS. 7 to 9, the size W is 10 μm or more. The head slider proper, depending on the type thereof, has the total length of about 1.25 mm and the total width of about 1.0 mm or the total length of about 0.85 mm and the total width of about 0.70 mm, for example.

Figure 10:
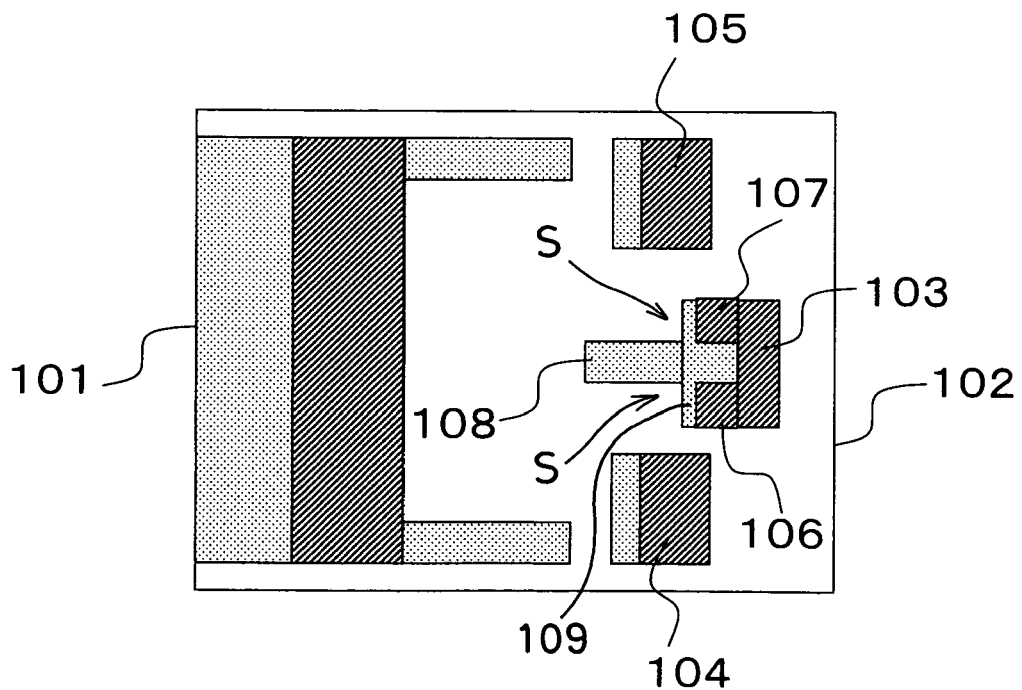
FIG. 10 is a plan view showing a tenth embodiment of the invention.

FIG. 10 is a plan view showing the surface of the head slider opposed to the medium according to a tenth embodiment of the invention. Numeral 101 designates an inflow end by way of which the air flows in, and numeral 102 an outflow end by way of which the air flows out. Numeral 103 designates a center pad portion, and numerals 104, 105 side pad portions, and numerals 106, 107 portions of a channel-shaped structure formed as an air-bearing surface A of the center pad portion 103. This tenth embodiment has the feature in the structure of the center pad portion 103. Specifically, the part of the center pad portion 103 nearest to the recording medium surface constituting the air-bearing surface A is formed in the shape of a channel together with the rear transverse extension and the longitudinal extensions on the two sides in the front part. Also, in the area in front of the air-bearing surface A of the center pad portion 103, a stepped surface D lower than the air-bearing surface A is configured of an area 109 immediately before the air-bearing surface A and a central protrusion 108 extending upstream of the head slider from the area 109.

The employment of this structure can realize robustness against the peripheral velocity of the magnetic recording medium. Also, in the case where only the air-bearing surface A of the center pad portion 103 is formed substantially in the shape of a channel with longitudinal pad portions 106, 107, the head slider might fly with the central part thereof radially rising in profile. According to this embodiment, however, the provision of the central protrusion 108 extending forward of the stepped surface D exhibits the special effect of concentrating the air flowing into the head slider in the directions of arrows S, so that the radial profile of the flying head slider is flattened.

FIG. 11 is a plan view showing the surface of the head slider opposed to the medium according to an 11th embodiment of the invention. Numeral 111 designates an inflow end by way of which the air flows in, and numeral 112 an outflow end by way of which the air flows out. Numeral 113 designates a center pad portion, and numerals 114, 115 side pad portions, and numerals 116, 117 parts of a channel-shaped structure formed as an air-bearing surface A of the center pad portion. Numeral 118 designates a central protrusion formed as a stepped surface of the center pad portion, and numeral 119 a chamfered portion formed as a stepped surface at the outer root downstream of the central protrusion 118. The 11th embodiment, though analogous to the tenth embodiment shown in FIG. 10, is different from the tenth embodiment in that the chamfered portion is formed as a stepped surface at the outer root constituting the downstream end of the central protrusion 118. As a result, the dependency on atmospheric pressure can be somewhat reduced in the case where the head slider is located radially outside of the magnetic recording medium. Specifically, this structure prevents the head slider from flying too high due to an excessive dependency of the head slider on the atmospheric pressure in the case where the head slider is located radially outside of the magnetic recording medium.

FIG. 12 is a plan view showing the surface of the head slider opposed to the medium according to a 12th embodiment of the invention. Numeral 121 designates an inflow end by way of which the air flows in, and numeral 122 an outflow end by way of which the air flows out. Numeral 123 designates a center pad portion, numerals 124, 125 side pad portions, numeral 126 an inner negative pressure area, and numeral 127 an outer negative pressure area. According to the 12th embodiment, the negative pressure area 126 of the head slider inward of the recording medium is expanded toward the inflow end 121 of the head slider more than the outer negative pressure area 127.

Specifically, the length of the longitudinal size of the stepped surface 129 on the most inflow end side of the inflow pad portion is minimized and, at the same time, the rear edge of the air-bearing surface A of the inflow pad portion is located as forward as possible. In this way, the negative pressure area 126 of the head slider radially inside of the recording medium is enlarged as far as possible. In order to prevent the negative pressure area 127 on the outer peripherally side of the head slider from being increased excessively, on the other hand, a stepped surface 128(D) is extended only on the outer peripheral side of the recording medium on the rear of the air-bearing surface A of the inflow pad portion. By expanding the inside negative pressure area 126 in this way, even in the case where a high pressure is generated by the inner side pad portion 124, the variation in the "rolling" direction of the head slider due to the radial position of the recording medium, i.e. the transversal inclination of the head slider as viewed from the front, can be minimized.

Figure 13:
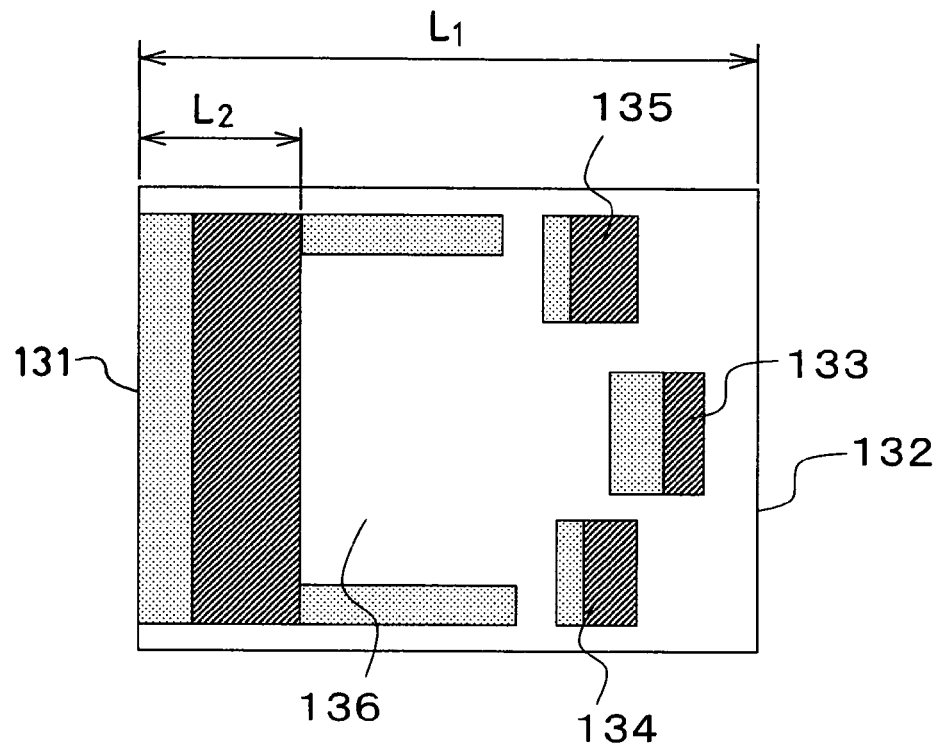
FIG. 13 is a plan view showing a 13th embodiment of the invention.

FIG. 13 is a plan view showing the surface of the head slider opposed to the medium according to a 13th embodiment of the invention. Numeral 131 designates an inflow end by way of which the air flows in, and numeral 132 an outflow end by way of which the air flows out. Numeral 133 designates a center pad portion, numerals 134, 135 side pad portions and numeral 136 a negative pressure area. According to the 13th embodiment, the negative pressure area 136 is formed of not more than 25% of the total longitudinal length of the head slider from the inflow end 131 of the head slider. In other words, the distance L2 from the inflow end 131 to the starting point of the negative pressure area 136 is set at not more than 25% of the length L1 of the head slider from the inflow end 131 to the outflow end 132.

As a result, the negative pressure area 136 can be widened further, and the change in pitch angle of the head slider due to the variation in atmospheric pressure can be reduced to stabilize the position of the head slider.

Figure 14:
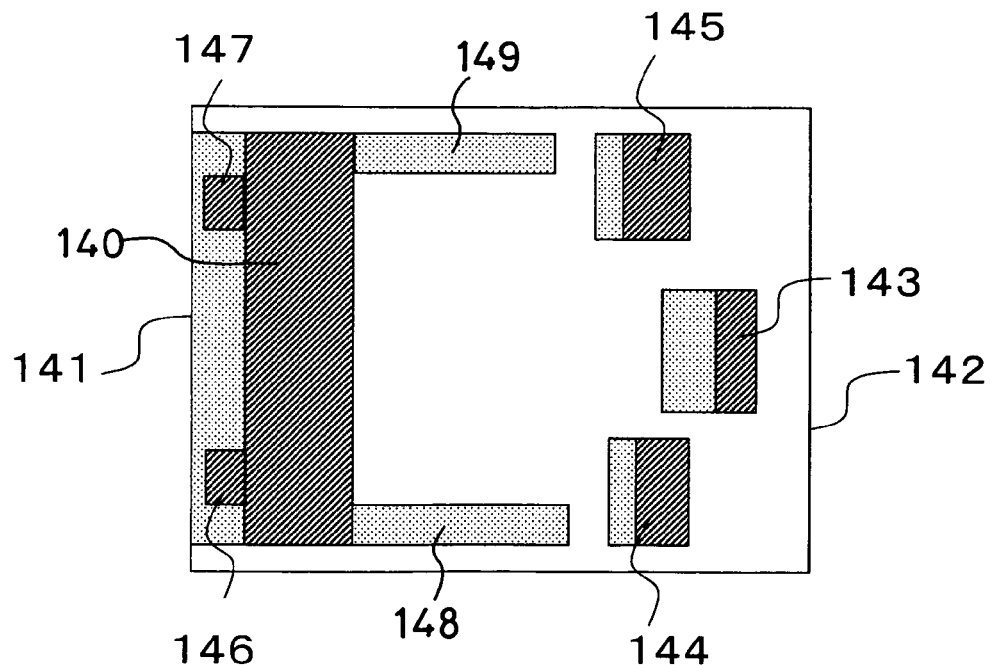
FIG. 14 is a plan view showing a 14th embodiment of the invention.
Figure 15:
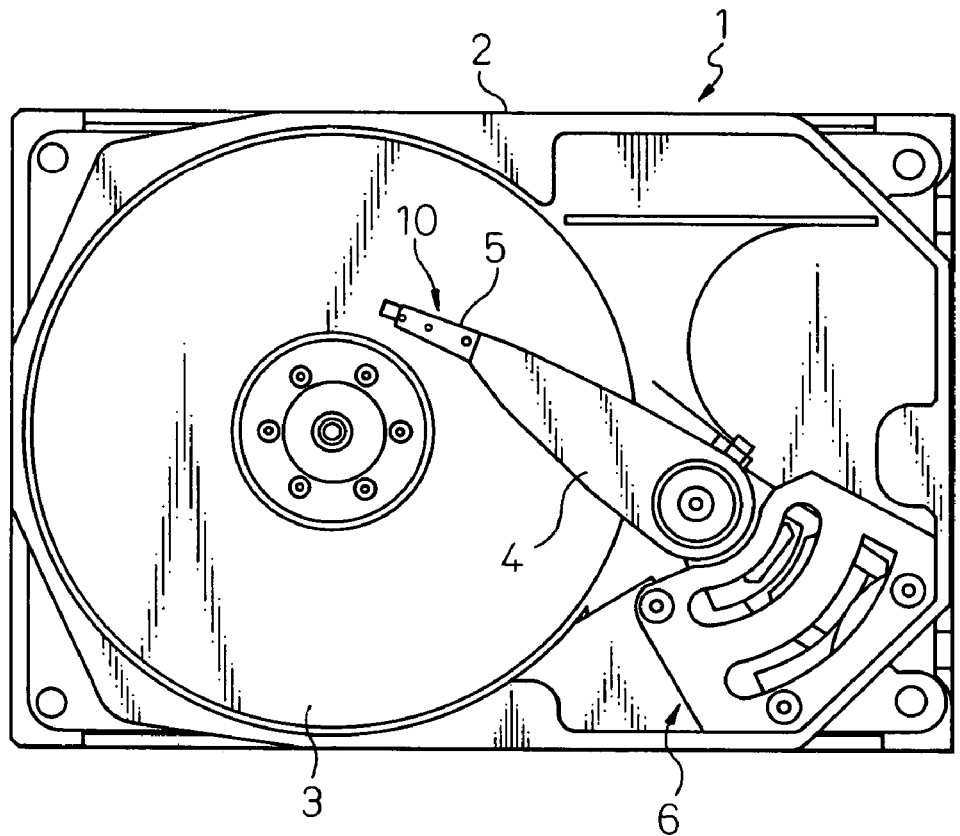
FIG. 15 is a plan view schematically showing a disk apparatus.
Figure 16:
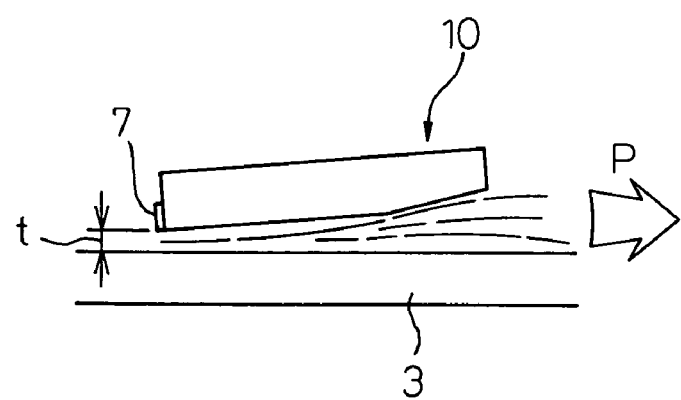
FIG. 16 is a side view of a head slider of a disk apparatus.

FIG. 14 is a plan view showing the surface of the head slider opposed to the medium according to a 14th embodiment of the invention. Numeral 141 designates an inflow end by way of which the air flows in, and numeral 142 an outflow end by way of which the air flows out. Numeral 143 designates a center pad portion, numerals 144, 145 side pad portions and numerals 146, 147 inner and outer protrusions, respectively, in the inflow pad portion. According to the 14th embodiment, the protrusions 146, 147 constituting the air-bearing surface are formed in the inside and outside areas of the front stepped surface of the air-bearing surface A of the inflow pad portion. These protrusions 148, 149 are located near to the side edges of the head slider at the positions somewhat nearer to the center than the side rail portions 148, 149. Also, as shown in FIG. 14, the protrusions 146, 147 extend forward substantially to the inflow end 141 from the inflow pad portion 140 formed as an air-bearing surface.

As described above, according to the 14th embodiment, the provision of the protrusions 146, 147 constituting the air-bearing surfaces in the neighborhood of the side edges of the inflow end 141 improves the dependency of the pitch angle of the head slider on the peripheral velocity.

The head slider of the disk apparatus according to various embodiments of the invention is described above with reference to the accompanying drawings. The invention, however, is not limited to these embodiments, but may take various other forms and may be modified and changed variously without departing from the spirit and scope of the invention.

It will thus be understood from the foregoing description that, according to the invention, there is provided a head slider of a disk apparatus in various shapes whereby the change in the flying height due to the change in atmospheric pressure is reduced, so that even in the case where the atmospheric pressure changes with an altitude above sea level from zero to 4200 m, for example, the flying height of the head slider can be reduced to 0 nm effectively. Further, the flying height of the head slider can be increased within the altitude range of zero to 4200 m. Also, the dependency of the flying height of the head slider on the peripheral velocity and the dependency of the pitch angle can be improved.

The invention claimed is:

1. A disk apparatus comprising:
   a disk type magnetic recording medium, having an inner peripheral side and an outer peripheral side; and
   a head slider further comprising
   a magnetic element adapted to fly over the disk type magnetic recording medium to record or reproduce magnetic information between the magnetic element and the magnetic recording medium;
   a surface of the head slider opposed to the medium comprising with respect to die direction in which the medium runs, an inflow pad portion at the upstream end and a pair of side rail portions extending downstream from the inflow pad portion, a center pad at the central part, and a pair of side pads on the sides of the center pad and upstream of the center pad at the downstream end of the head slider; and
   at least one of the side pads having an air-bearing surface and a stepped surface of a height smaller than that of the air bearing surface,
   the air-bearing surface having a longitudinal extension and a traverse extension to define a substantially L-shaped structure.

2. The disk apparatus as set forth in claim 1, wherein at least one of the side pads has the longitudinal extension of the substantially L-shaped structure located at an outer peripheral side of the side pad that is closest to the outer peripheral side of the magnetic recording medium, so that the substantially L-shaped structure is opened toward the inner peripheral side of the magnetic recording medium.

3. The head slider as set forth in claim 2, wherein the other one of the side pads has the longitudinal extension thereof located at an outer peripheral side of the side pad that is closer to the outer peripheral side of the magnetic recording medium, so that the substantially L-shaped structure thereof is opened toward the inner peripheral side of the magnetic recording medium.

4. The head slider as set forth in claim 2, wherein the other one of the side pads has the longitudinal extension thereof located at an inner peripheral side of the side pad that is closer to the inner peripheral side of the magnetic recording medium, so that the substantially L-shaped structure thereof is opened toward the outer peripheral side of the magnetic recording medium.

* * * * *